T. O'BRIEN & J. McLOUGHLIN.
RUG FOR ANIMALS.
APPLICATION FILED NOV. 17, 1917.
1,293,521.
Patented Feb. 4 1919.
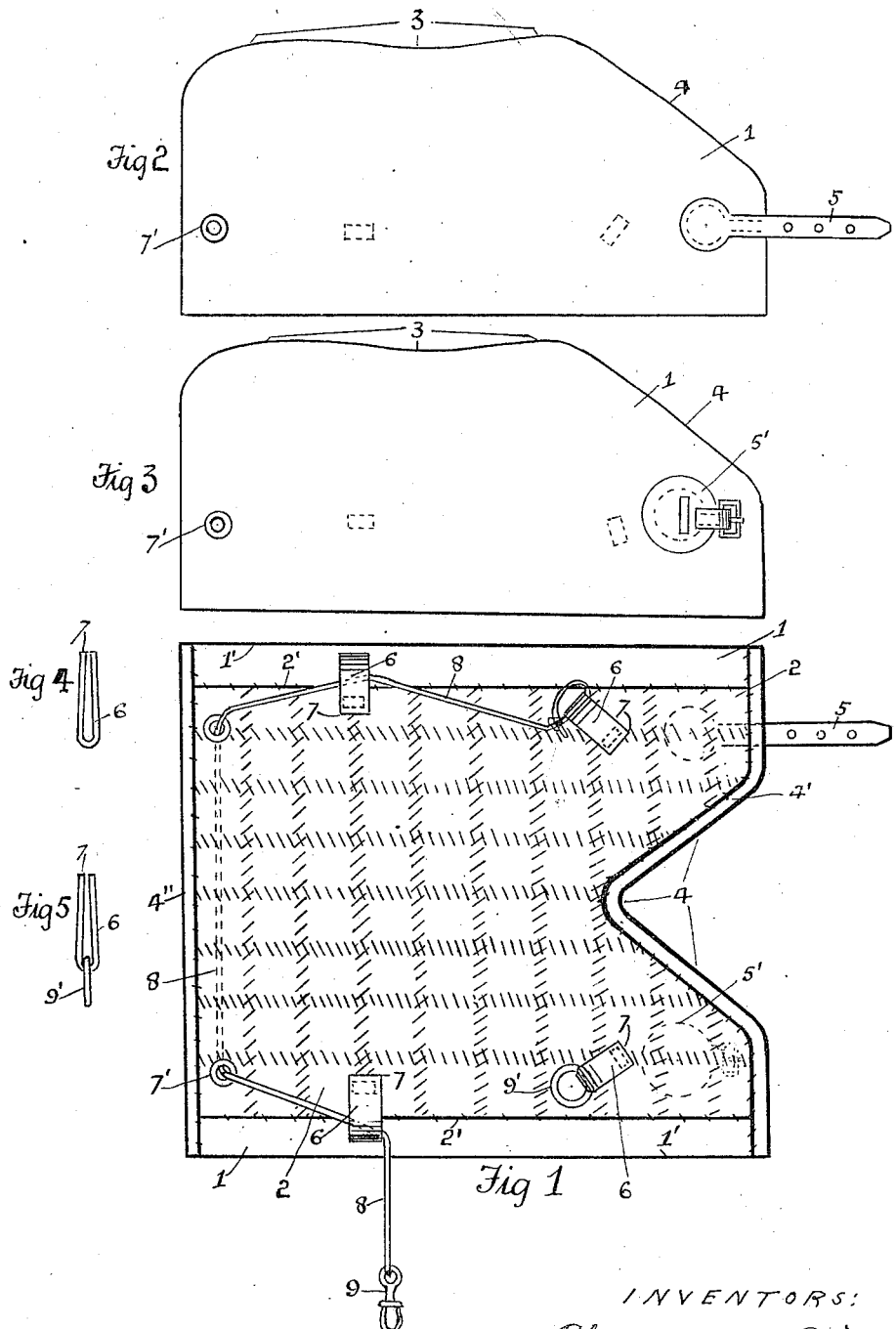
INVENTORS:
Thomas O'Brien
Joseph McLoughlin
By [signature]
ATTY.

UNITED STATES PATENT OFFICE.

THOMAS O'BRIEN, OF WATERLOO, SYDNEY, NEW SOUTH WALES, AUSTRALIA, AND JOSEPH McLOUGHLIN, OF ILFORD, ENGLAND.

RUG FOR ANIMALS.

1,293,521. Specification of Letters Patent. Patented Feb. 4, 1919.

Application filed November 17, 1917. Serial No. 202,560.

*To all whom it may concern:*

Be it known that we, THOMAS O'BRIEN and JOSEPH McLOUGHLIN, subjects of the King of Great Britain, residing, respectively, at 41 Pitt street, Waterloo, Sydney, New South Wales, in the Commonwealth of Australia, and at 18 Gordon road, Ilford, in the county of Essex, England, Great Britain, have jointly invented new and useful Improvements in Rugs for Animals, of which the following is a specification.

Our invention relates to improvements in rugs for covering that portion of animals which it is important shall be kept dry and warm to prevent chill to the animal. Rugs of the description referred to owing to the hitherto known methods of attachment to the animal are difficult to keep in position, particularly when the animal, as is frequently the case, disports itself in the way of rolling, with the result that the part desired to be covered becomes exposed: and the object of our improvement is to provide a ready and simple means whereby a rug may be so secured on the animal that despite any extreme or abnormal movement of such animal the rug shall remain in the desired position, the improvement consisting of a cord or equivalent device so arranged relatively to the rug as to enable it to operate in the manner as will hereinafter appear.

We attain our object by the means illustrated in the accompanying drawing, in which:—

Figure 1 illustrates the inner side of a rug opened out and laid flat provided with fastening means in accordance with our improvement.

Figs. 2 and 3 respectively represent the outer surface of a rug illustrated by Fig. 1, after it has been folded longitudinally so as to form two sides, Fig. 2 representing one half or side of the rug and Fig. 3 the other half or side of the rug.

Figs. 4 and 5 represent details hereinafter referred to.

Similar numerals refer to similar parts throughout the several views.

1 is the material (which may be of any suitable kind) which either alone or in conjunction with a lining 2 of any suitable material constitutes the rug proper. The material 1 and the lining 2 (when used) are preferably formed into the shape shown in Figs. 2 and 3 so as to approximate the contour of the animal's back. The shape indicated at 3 may be produced by folding or securing the material (and lining) and stitching it at the fold or seam or the said shape may be produced in any other suitable way. Part of the material and lining (if used) at 4 is removed to accommodate the neck of the animal and permit the closing down of the rug or cloth on to the animal in such way as to cover its shoulders and chest. If a lining is employed such lining is preferably so secured to the material 1 as to leave a margin between the edges 1' of such material and the edges 2' of the lining, the edges 2' of such lining being turned in in order to be neatly secured to the material 1 as shown in Fig. 1. In this way a strip of the material 1 at its two wider edges is left unlined. The lining 2 and material 1 may at the edges 4. 4' and 4'' be secured to each other by turning the material and the lining together and stitching through them. In some cases the edges 4. 4' and 4'' may be bound together by means of braid. 5. 5' indicate respectively a strap and buckle attached to the rug by means of which the forward end of such rug may be secured over the shoulders and chest of the animal. The construction so far described constitutes the rug proper.

At the wider edges of the rug we provide a cord preferably of soft cotton and retain such cord in position relatively to the rug by any suitable means and in such way that the cord is anchored at one end near one of the wider edges of the rug and is slidingly held also near such edge as well as the rear edge of the rug and the other of the wider edges thereof. The means we prefer for retaining the cord or rope in position consist of loops 6 preferably formed of leather folded as more clearly shown by Figs. 4 and 5, such loops being secured at the ends 7 to the underside of the rug or cover and eyelets 7'. It is important that the two loops adjacent to the rear edge of the rug should at their folded ends be nearer to the extreme edges of the rug than the eyelets and other loops as shown. The cord 8 as will be seen is at one end thereof provided with the spring hook 9 which when the rug is on the animal hitches on to the ring 9' carried by one of the loops near the forward end of the rug and such cord is successively passed through the loops and eyelets and secured at its other end to the loop located opposite to the loop carrying the ring all as shown by Fig. 1.

To place the rug in position on the animal such rug is opened out (the spring hook being detached from the ring 9') and so placed on the animal that its respective wider edges will depend on each side of the animal. The edges of the rug at its forward end are then drawn together (so as to cover the animal's shoulders and chest) by the strap 5 and buckle 5' and such edges thus secured together. The cord is then pulled on at the end carrying the spring hook with the result that the rug is drawn on to the animal (the cord through the eyelets passing over the animal's haunches). The same end of the cord is then passed under the animal's body and over the cord held to the opposite depending portion of the rug, brought to the ring 9' and hitched thereto.

We lay no broad claim to the construction of the rug proper as above described as such is either a known or an obvious construction: and such rug proper may be constructed in any other or well-known manner so long as it is adapted to receive the means above referred to (the subject of our improvement) for securing it to the animal, but,

We claim:

1. In rugs for animals, means for securing such rugs to the animal consisting of a cord and a series of loops, and an aperture respectively secured to and formed in the rug near the lower edges of those portions thereof which depend on each side of the animal, one end of the cord being fastened to a loop at one depending side of the rug and passing through another loop and an aperture on the same depending side and thence through an aperture and a loop in and on the other depending side of the rug and (after being passed over the portion of itself on the first-mentioned depending side) being at its free end removably secured or hitched to a ring carrying loop at the second mentioned depending portion of the rug substantially as hereinbefore specified.

2. In combination, a rug for animals of substantially rectangular formation, and means for securing said rug in position on an animal comprising a cord fastened at one of its ends to said rug near the lower edge of that part which depends at one side of the animal, the opposite end of said cord being removably connected to that portion of the rug depending at the other side of the animal, said cord being slidably held between the two points of attachment substantially parallel and adjacent to three edges of said rug by being passed through apertures formed in the rug near the rear edge thereof.

THOMAS O'BRIEN.
JOSEPH McLOUGHLIN.

Witnesses:
H. C. FOWLER,
B. H. FOWLER.

Copies of this patent may be obtained for five cents each, by addressing the "Commissioner of Patents, Washington, D. C."